March 4, 1947.  M. A. GLEESON  2,416,917
PACKING GLAND
Filed Nov. 29, 1943  2 Sheets-Sheet 1

Inventor:
Murray A. Gleeson.
By Joseph O. Lange, Atty.

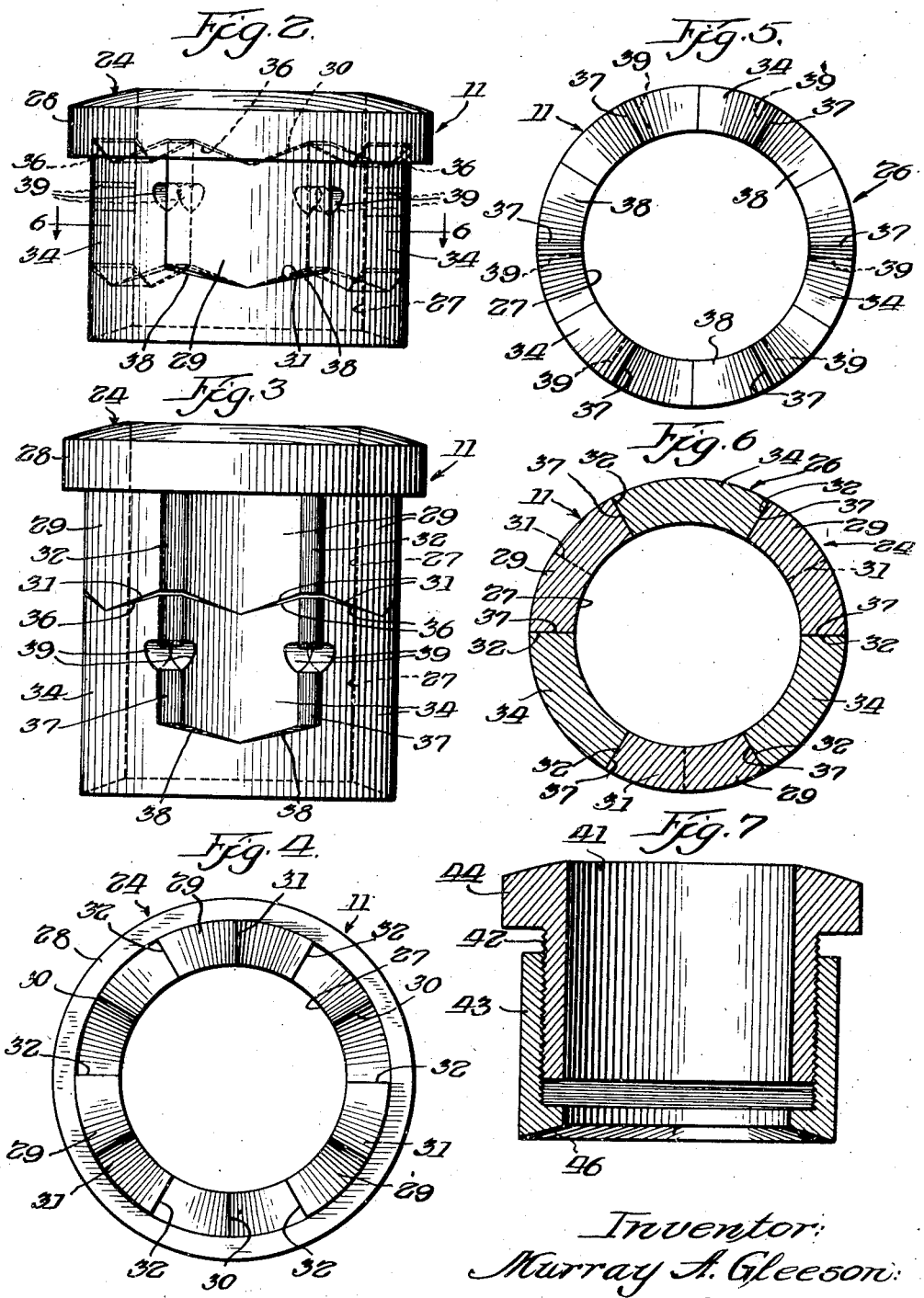

Patented Mar. 4, 1947

2,416,917

UNITED STATES PATENT OFFICE 2,416,917

PACKING GLAND

Murray A. Gleeson, Chicago, Ill., assignor to Crane Co., Chicago, Ill., a corporation of Illinois Application November 29, 1943, Serial No. 512,233

3 Claims. (Cl. 286—31)

This invention relates to glands for stuffing boxes and is more particularly concerned with a gland formed of two or more parts telescopically arranged, or otherwise, for the purpose of varying the overall length of the gland as desired.

A further object of this invention resides in the provision of a multiple piece gland in which the several parts are threaded for axial adjustment relative to each other for varying the overall length of the gland.

This invention further contemplates the provision of a gland having several parts formed with abutment shoulders providing a step-by-step axial adjustment of the parts for varying the length of the gland.

This invention embodies other novel features, details of construction and arrangement of parts which are hereinafter set forth in the specifications and claims and illustrated in the accompanying drawings, forming part thereof, wherein:

Fig. 2 is a detail side elevation view of the gland shown in Fig. 1 and in which the several parts thereof are arranged to provide the minimum overall gland length.

Fig. 3 is a side elevational view of the gland illustrated in Fig. 2, showing the parts thereof arranged to provide the maximum overall gland length.

Fig. 4 is a view of the underside of the top member constituting the novel gland.

Fig. 5 is a plan view of the lower member of the gland.

Fig. 6 is a transverse sectional view taken along the line 6—6 of Fig. 2.

Fig. 7 is a vertical sectional view showing a modified form of this invention in which the gland parts are threaded for axial telescopic adjustment with respect to each other for varying the overall length of the gland.

Figure 1:
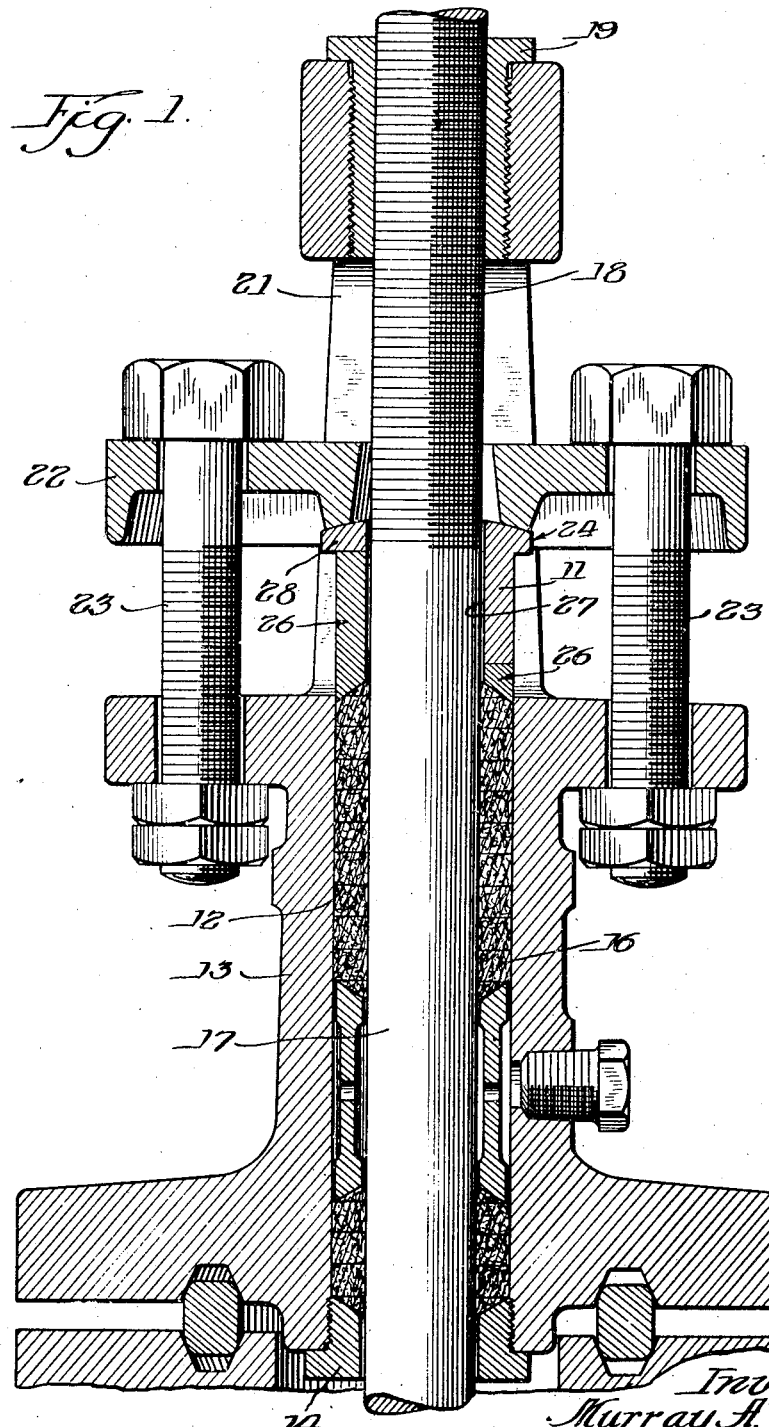
Fig. 1 is a vertical sectional view showing a gland embodying features of this invention as employed with a stuffing box on a valve of the yoke bonnet type.

Referring now to the drawings for a better understanding of this invention and more particularly to Figs. 1 to 6 therein, a gland 11 embodying features of the invention is shown mounted for use with a stuffing box 12 formed in a bonnet 13 of a relatively high temperature and high pressure steam valve. In valves of this type the stuffing boxes are relatively deep to prevent leakage while the glands are usually formed having an overall length corresponding to glands employed with relatively shallow stuffing boxes. The stuffing box 12 extends down to the repacking seat bushing 14 and is filled with a relatively large number of packing rings 16 to prevent leakage past a stem 17. The stem is threaded at 18 for engagement in a threaded yoke bushing 19 mounted in yoke arms 21. The gland is moved axially to compress the packing within the stuffing box by means of the usual gland flange 22 and gland flange bolts 23.

The gland 11 comprises an upper member 24 and a lower member 26 which are bored at 27 to receive the stem. The upper member is formed with a flange portion 28 for engagement by the gland flange and with a plurality of downwardly disposed spaced fingers 29 having radially extending ridges 30 and convex ends 31 with parallel side walls 32. The width of the fingers is preferably substantially equal to the width of the spaces therebetween. The lower member 26 is formed with a plurality of upwardly projecting fingers 34 having concave ends 36 and parallel side walls 37 and is formed concave between the fingers at 38. Notches 39 are formed in the side walls 37 of the fingers 34.

In the use of a gland of the type thus described when the stuffing box is full of packing or being repacked, the upper end lower members are arranged as shown in Figs. 1, 2 and 6 in which the fingers 29 and 34 are arranged side-by-side to provide a minimum overall length. After the packing has become worn and compressed into the stuffing box a distance equal to the minimum length of the gland, the upper member 24 is then moved axially and rotated to bring the fingers 29 and 34 into alignment to provide the maximum overall length. In this form of the invention the upper and lower members are each preferably formed with three fingers, and the convex ends 31 of the fingers 29 preferably provide for point engagement in the concave ends 36 of the fingers 34. The notches 39 are provided in the member 26 for insertion of a hook-shaped tool (not shown) to facilitate removal of this member from the stuffing box.

Fig. 7 illustrates a modified form of this invention in which an upper member 41 is provided with external threads 42 for threaded engagement with an internally threaded lower member 43 to provide a telescopically adjustable gland. A flange portion 44 is formed on the upper member 41 and a packing engaging shoulder 46 is formed on the lower member 43.

The types of glands thus described and illustrated in the drawings are particularly suited for use on devices wherein the space for axial movement of the gland away from the outer end of the stuffing box has heretofore been limited to the use of a minimum length gland, and in which the stuffing boxes have sufficient depth to accommodate a longer gland than has heretofore been provided.

While I have shown my invention in but two forms it is obvious to those skilled in the art that it is not so limited but is susceptible of various changes and modifications without departing from the spirit thereof or the appended claims.

I claim:

1. In a gland for a stuffing box or the like, the combination comprising a plurality of substantially tubular members, the walls of which are in axial alignment, one of the said tubular members having an annular flanged portion at its upper end with a plurality of annular spaced apart projections depending therefrom, one of the tubular members having longitudinal projections normally engageable with the spaces between the first named projections, whereupon predetermined axial movement and subsequent rotation of one of the tubular members relative to the other tubular member the overall length of the gland is increased by an amount measured by the combined axial length of the projections on the tubular members.

2. A stuffing box gland member or the like, comprising a plurality of substantially axially aligned tubular members normally positioned in end to end relation, annularly arranged relatively narrow projections on the opposed end portions of the said tubular members, the spaces between said narrow projections of each tubular member normally receiving the opposite narrow projections of the other axially aligned tubular member, whereby upon predetermined axial movement and subsequent rotative movement of one tubular member relative to the other the overall length of the gland member or the like is increased to an extent substantially equal to the combined height of the narrow projections of the tubular members, the limits of the inner end portions of the spaces being substantially concave, the end limits of the narrow projections being convex, the curvature of the latter being greater than the concave part defining the inner portion of the spaces, whereby a substantially radially extending line bearing is provided between the end limits of the spaces and the projections when the tubular members are assembled in abutting end to end relation.

3. A stuffing box gland member or the like, comprising a plurality of substantially axially aligned tubular members normally positioned in end to end relation, annularly arranged relatively narrow projections on the opposed end portions of the said tubular members, the spaces between said narrow projections of each tubular member normally receiving the opposite narrow projections of the other axially aligned tubular member, whereby upon predetermined axial movement and subsequent rotative movement of one tubular member relative to the other the overall length of the gland member or the like is increased to an extent substantially equal to the combined height of the narrow projections of the tubular members, the annularly arranged projections on one tubular member having their end limits of concave form, the annular projections on the other tubular member having their end limits of convex form, the curvature of the latter being greater than the concave end limits of the first named projections, whereby upon positioning the said tubular members so that the respective projections are in abutting relation a line bearing contact is provided between the ends of the projections of the said tubular members.

MURRAY A. GLEESON.

REFERENCES CITED

The following references are of record in the file of this patent:

UNITED STATES PATENTS

| Number | Name | Date |
|---|---|---|
| 623,127 | Ball | Apr. 18, 1899 |
| 1,888,539 | Otterson | Nov. 22, 1932 |
| 1,956,843 | Wheeler | May 1, 1934 |

FOREIGN PATENTS

| Number | Country | Date |
|---|---|---|
| 19,966 | British | 1892 |
| 6,257 | British | 1913 |